United States Patent [19]

Andreaggi et al.

[11] 3,898,688

[45] Aug. 5, 1975

[54] VISUAL AND MAGNETIC RECORD

[75] Inventors: Joseph R. Andreaggi, Short Hills; Robert J. Graf, Newark; Matthew J. Relis, Teaneck, all of N.J.

[73] Assignee: Joseph R. Andreaggi, Short Hills, N.J.

[22] Filed: Dec. 28, 1973

[21] Appl. No.: 429,203

Related U.S. Application Data

[62] Division of Ser. No. 250,872, May 8, 1972, Pat. No. 3,823,405.

[52] U.S. Cl. .................................... 360/4; 360/131

[51] Int. Cl. ............................................ G11b 5/00

[58] Field of Search ........... 360/2, 4, 131; 191/1 R, 191/19; 235/61.12 M

[56] References Cited

UNITED STATES PATENTS

| | | | |
|---|---|---|---|
| 2,962,339 | 11/1960 | Woo et al. | 360/4 |
| 3,045,218 | 7/1962 | Brand | 360/4 |
| 3,245,064 | 4/1966 | Brand | 360/4 |
| 3,401,394 | 9/1968 | Leonard et al. | 360/4 |
| 3,665,513 | 5/1972 | Benson et al. | 360/4 |
| 3,711,655 | 1/1973 | Yamada | 360/4 |
| 3,756,365 | 9/1973 | Markakis | 360/4 |

*Primary Examiner*—Vincent P. Canney
*Attorney, Agent, or Firm*—Jerry M. Presson

[57] ABSTRACT

A medium is disclosed for recording visual and magnetic data on a single document. The medium is comprised of a flexible sheet having a visually readable front surface and a backing of a magnetizable flexible material. Alphanumeric characters are visually recorded on the front sheet surface, for example, by a typewriter, and monotracks of discrete groups of magnetically-coded characters corresponding to the visual characters are applied to the exterior surface of the backing in fixed position relationship to corresponding ones of the visual characters. The areas between groups of adjacent magnetically coded characters are degaussed to enhance the overall accuracy of the magnetic record.

5 Claims, 7 Drawing Figures

VISUAL AND MAGNETIC RECORD

This application is a division of application Ser. No. 250,872, filed May 8, 1972, now U.S. Pat. No. 3,823,405.

The present invention relates generally to systems for providing a visual and a corresponding magnetically encoded record of date and more particularly a system wherein the recorded data is stored on a single medium in both visual and magnetic modes with fixed positional correlation therebetween.

Prior art systems of the type presently under consideration typically employ permanent magnets mounted on type bars of a typewriter, the permanent magnets being located either within or below the print font. In these systems, the magnetic data is recorded coincidentally as visual data is typed on an opaque paper sheet having a magnetic backing thereon or impregnated with magnetic material. When a key of the typewriter is struck, by an operator's finger, permanent magnets are translated into contact with, or in close proximity to, the magnetic portion of the sheet thereby generating magnetic flux on the surface of the sheet being imprinted. Paper thickness and magnetic characteristics prevent effective recording through a paper sheet to a magnetic backing record with permanent magnets that strike the sheet from the paper or front side. Hence, those systems wherein magnetic data is recorded by relying upon magnetic flux being transmitted through a sheet of paper to a magnetic backing are most likely not sufficient to enable detection of the magnetically recorded data without appreciable error. While errors may not be introduced by recording on a sheet of paper having magnetic material, such as ferromagnetic particles, impregnated therein, such a sheet generally takes on the dark hue of the black particles embedded therein making it difficult to discern the data visually recorded thereon. Also, erasure of typed material from paper having magnetic material embedded therein is impractical because of adverse effects on the appearance of the printed material on the sheet and irregularities likely to be introduced by erasing on the magnetic surface. Such irregularities may cause problems in correctly detecting recorded magnetic flux during read-back.

Another disadvantage of systems wherein permanent magnets are carried on the faces of type bars is that codes for space, tab or carriage return functions cannot be included without providing special type bars on the typewriter. Without tab or carriage return codes being introduced onto the magnetic medium, the time required for reading out information from the magnetic record is considerably increased over the time required for records that carry such information. If no space code is provided on the recording medium, it is essential that the medium carry some suitable type of timing or synchronizing tracks, in which case the recorded data cannot be considered as self-clocking or self-synchronized.

Another disadvantage of systems employing permanent magnets on type bar faces is that the magnet flux level decreases in response to each mechanical strike against a platen. Eventually, the magnetic flux level in the magnets could quite conceivably be reduced to a point where sufficient magnetic flux is not recorded on the magnetic medium and accurate reproduction of data during read-back does not occur. While magnets may be recharged through the utilization of special equipment, the recharging operation is a costly and time-consuming operation. In addition, an operator is not usually apprised as to when recharging is necessary.

In certain prior art systems magnets are carried within the character head itself. These systems, in addition to suffering from the previously discussed disadvantages, are likely to have the character head structure so weakened mechanically that a head might be broken after little use. Another disadvantage attendant with systems wherein magnets are mounted on the head is that small characters, such as commas and periods, cannot carry the magnets because there is not enough surface area on the character head for more than one magnet. In consequence, a character such as a period or comma that is always located in the lower center portion of the key face cannot be distinguished if a permanent magnet is embedded in the character itself.

Systems wherein permanent magnets are placed beneath the print character head are beset by additional problems. In general, only upper case print fonts can be utilized in such systems because the lower case character is usually replaced with a magnet structure. While some systems proposed have both upper and lower case fonts, with two magnets extending below the characters, it is believed that these systems are not practical because different typewriters have different sized platens and platens frequently become out-of-round after any extended period of use. The problems of platen size and out-of-roundness are also prevalent with the systems wherein a magnet replaces a lower case character because the magnet and the upper case character must both simultaneously strike a rounded portion of the platen.

Another problem associated with having a magnet below the print character is that the magnetically recorded data may not properly be written onto the magnetic medium at the bottom of the page. As is well known, typing personnel frequently are not aware of the fact that they are typing on the last line of a sheet of paper, or type below a point where the paper stays horizontally aligned with the result that magnetically recorded data below the line becomes difficult to detect accurately. The possibility of incomplete erasures of erroneous magnetic bits is also likely in these systems.

In a second class of prior art systems, electric signals are generated in response to the activation of each key on a typewriter keyboard, with different codes representing each key. In response to the electric signals, different discrete areas or spots on a magnetic recording member are magnetized at a plurality of horizontal and vertical matrix positions having a total area equal approximately to the area required for a character. Because a plurality of horizontal parallel lines are utilized to represent each character magnetically, a single head is not feasible for reading back all of the data associated with a particular character. Moreover, because the number of magnetic spots recorded for each character is variable and the spots are at different positions, the record formed with these systems is not self-clocking and hence synchronizing tracks must be provided.

In addition to the aforementioned problems, this system typically suffers from a lack of complete keyboard encoding functions, such as spacing, carriage return, shifting between upper and lower case and character deletion.

The aforementioned disadvantages of known prior art systems are essentially overcome by the system of the instant invention. The instant system utilizes a single, flexible recording medium, to record in the visually readable and magnetic modes. More specifically, the medium is constituted of a paper sheet of suitable color, such as white, having a portion of one surface covered with a thin, ferromagnetic film or strip. In response to each key activation of an encoding typewriter, bi-polarity magnetic data bits are applied to discrete surface areas of the magnetic film. The magnetic data representative of each character is applied to the magnetic film by means of a coreless magnetic recording head formed of a plurality of conductors. Each conductor is selectively pulsed by a current in accordance with a code representative of the selected and depressed key. In one particular embodiment, eight bits are recorded for each character or functional operation (e.g., space bar activation). Included are shift key and parity bits, whereby both lower and upper case characters may be inscribed on and read from the record and self-clocking can be realized. By applying bi-polarity data to the magnetic record the same number of bits is recorded for each character. By applying this data to the record serially, monotracks of data are obtained which represent serial character and functional key selections and activations, and therefore the record is completely self-clocking and no synchronizing track is required.

The magnetic recording head is positioned above and behind the location where a type bar comes into contact with a sheet on the platen and the conductor of the recording head are preferably in direct contact with the surface of the magnetizable film to achieve optimum flux-coupling between current-carrying conductors of this head and the magnetic recording medium. By positioning the recording head above the point where the type bar contacts the sheet the problem of run-off of data magnetically recorded at the bottom of the page is obviated. The problem of run-off at the top of the sheet normally does not arise because an operator normally allows enough spacing or heading at the top of each page to permit contact between the recording head and the magnetizable film.

It is, accordingly, an object of the present invention to provide a new and improved medium embodying human readable alphanumeric and magnetic data in fixed relative positional relationships.

A further object of the present invention is to provide a new and improved medium carrying human readable and magnetically recorded data, wherein the magnetically recorded data are self-clocking, and a system for recording such data on the medium.

In accordance with the present invention, erasing of the medium is accomplished by degaussing. In degaussing, the magnetic flux of the erased area is reduced below a detectable level for read-back purposes. This is accomplished by feeding a multiplicity of low duty cycle bi-polarity pulses to the record head. The first pulse in the multiplicity has a relatively high amplitude and succeeding pulses decrease successively in amplitude. In this manner the magnetic flux level on the area of the magnetic record beneath the head is successively reduced, eventually to a level where the read circuit cannot discern a polarized magnetic bit in the area of erasure.

In accordance with another aspect of the erasing apparatus utilized in the present invention, all of the conductors in the head assembly are connected to be responsive to the erasing pulses. Thus, if perfect alignment between the paper and the write head is not maintained, as is likely to occur when a sheet is removed from a typewriter and then re-inserted, previously recorded bits for a particular character are usually erased.

It is accordingly, still another object of the present invention to provide a new and improved system for selectively erasing magnetically recorded characters on a sheet including visual and magnetic data in a prescribed, fixed positional relationship.

The above and still further objects, features and advantages of the present invention will become apparent upon consideration of the following detailed description of several specific embodiments thereof, especially when taken in conjunction with the accompanying drawings, wherein.

THE VISUAL AND MAGNETIC RECORDING MEDIUM

Figure 1:
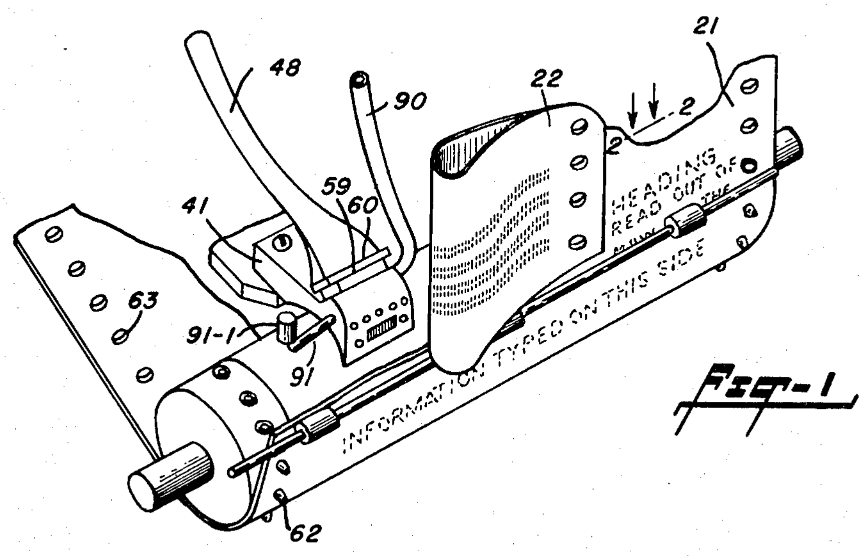
FIG. 1 is a perspective view illustrating the position of the recording head of the present invention relative to a platen and sheet of paper on which human readable and magnetic data are written, the upper left hand portion of the sheet being folded to depict magnetic bits applied thereto by the recording head in direct correspondence to the characters typed on the front of the paper sheet.
Figure 2:
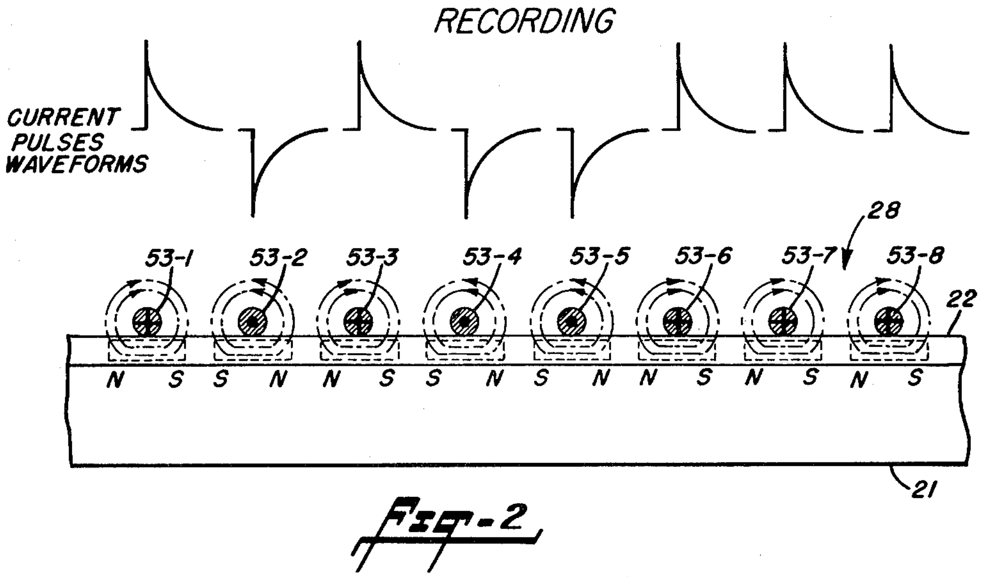
FIG. 2 is a cross-sectional view taken along lines 2—2 of FIG. 1 of the composite sheet of paper and a flexible magnetizable backing integral therewith, and additionally depicts typical electrical current waveforms for writing bipolarity magnetic bits onto the magnetizable backing.
Figure 3:
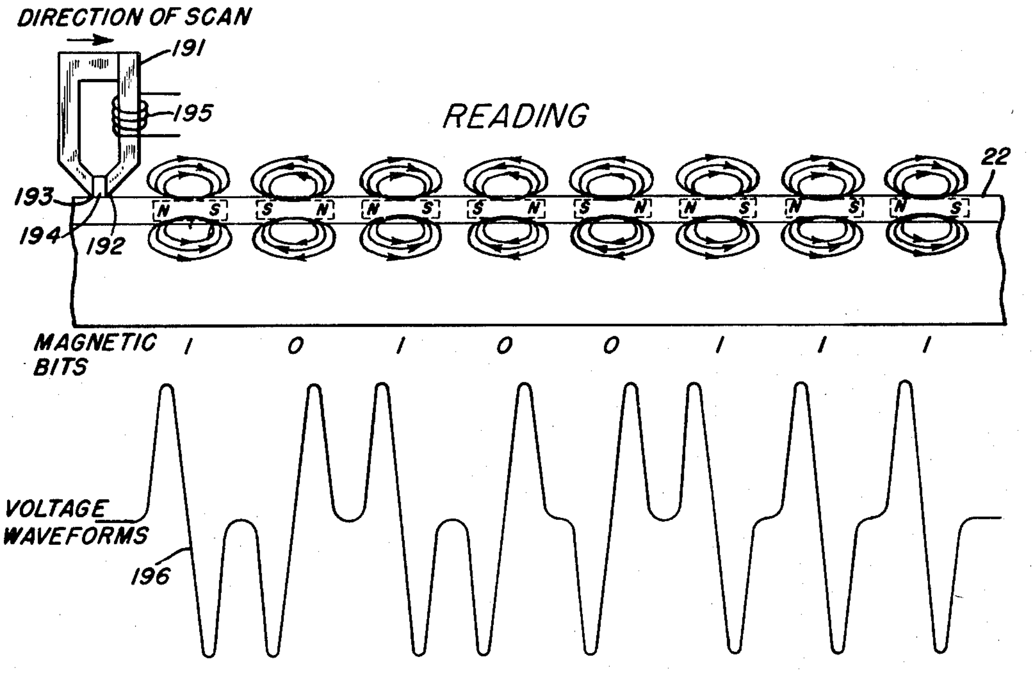
FIG. 3 is a cross-sectional view of the composite paper sheet and magnetizable backing taken along the direction of recording and additionally depicts voltage waveforms derived when the flux patterns from the backing are read.

Before proceeding with the detailed description of the apparatus of the present invention, a typical illustration of the data recorded by this apparatus may be had by reference to FIGS. 1 and 2. In these figures, there is illustrated a sheet of conventional bond paper 21 having a thickness on the order of 2 to 3 mils and a flexible backing sheet, coating, film or layer 22 composed of a highly magnetizable material, such as $Fe_2O_3$ or $Fe_3O_4$, upon which magnetic data bits can be recorded and stored. The layer 22 typically has a thickness on the order of 0.5 mil, and may be applied to the entire surface of one side of the paper sheet 21 by conventional methods.

Printed on paper sheet 21 are conventional typewritten alphanumeric characters, FIG. 1, each of which requires essentially the same discrete surface area. Typical conventional typewriters are designed to print ten characters per inch with each line spaced approximately 0.16 inch apart. On this exemplary basis, each discrete area alloted to, and occupied by, an alphanumeric character has a width dimension of approximately 100 mils and a height dimension of approximately 160 mils. Both upper and lower case letters of a complete 50-key typewriter keyboard can be printed on sheet 21 in single spaced line relationship, if desired. Human readable characters on the same line can be imprinted in succession and adjacent to each other on sheet 21, as in accordance with printing normally associated with and obtainable from a conventional typewriter.

As may be seen from FIG. 1, in vertical alignment with each alphanumeric character printed on sheet 21, there is a particular combination of eight bits of bipolarity magnetic data properly coded to represent any single key on the typewriter keyboard. The data bits are depicted as short vertical lines which together form a single track of magnetic bits on layer 22. An exemplary combination of eight bits is illustrated in FIG. 1. The area encompassing the eight bits is approximately the same width as a typewritten characters. Similarly, since these eight bits are the binary-coded representation of one particular character, the height of each of the eight bits is approximately the same as that of the character. Each group of eight bits is recorded simultaneously (or in situ) on the magnetic layer 22 in response to a corresponding key actuation at a position slightly above the corresponding key characterization, whereby a prescribed, fixed or one-to-one positional relationship is provided, between a generated character line and a corresponding multibit magnetic data track comprised of a succession of eight-bit groups. Hence, in FIG. 1 in the word "HEADING" the letter A is typewritten on a line at a position immediately below that where exemplary magnetic bits corresponding thereto are recorded, but the relative positions of the recorded visible and magnetic data along the width dimension of the sheet are aligned.

Therefore, the horizontal rows of alphanumeric data are parallel to, but offset a fixed distance from, the rows of single tracks of magnetic data on the magnetizable side of the recording medium. Each alphanumberic character is also in a prescribed vertical relationship (typically aligned) with each group of eight magnetic bits which are uniquely coded to represent that particular character.

The eight bits of recorded data representing one typed character are illustrated in FIG. 2 as oval lines carrying arrow heads indicating the polarity of the magnetism of the particular recorded bit; the bit polarity is also indicated by the relative positions of the magnetic north and south poles, N and S, on the left and right sides of the associated oval lines. Hence, magnetic 1 bits are represented by these mutually tangential oval lines having arrowheads pointing in the clockwise direction, as well as N and S on the left and right sides thereof. Magnetic 0 bits are of the opposite magnetic polarity and are represented by three mutually tangential oval lines having arrow heads pointing in the counterclockwise direction, as well as by magnetic poles S and N on the left and right sides, respectively, of the associated oval lines. The first six magnetic bits of each eight bit group, FIG. 2, indicate which key on the typewriter keyboard is depressed while the seventh bit indicates if the shift lever is depressed while the character is recorded (upper or lower case character). The last or eighth bit is used as a parity bit for error checking.

The parity check employed is such that an odd number of 1 and 0 bits is derived for each character. To illustrate, for lower case letter *a*, the first six bits may be 101001 while the seventh bit is a 1 bit to indicate that the shift lever was not activated and the eighth bit is also a 1 bit to provide the desired parity check. Upper case letter A would have the same first six bits as *a*, namely 101001, but the seventh bit is recorded as a 0 bit to indicate that the shift key was activated on the keyboard and the last bit is recorded as 0 bit to provide the required odd parity check.

MAGNETIC RECORDING — GENERAL

The eight magnetic bits for each key are created simultaneously on layer 22 by applying a corresponding number of rapidly changing electrical currents to the alloted area on the layer. Each magnetic bit so formed includes a north pole N and a south pole S laterally spaced from each other by a relatively small distance with the orientations of the poles along the width dimension of the paper indicating the code of the recorded character. Each magnetic bit center is spaced from an adjacent bit center a distance sufficient to provide adequate separation between adjacent magnetized areas to obtain a sufficiently well-defined voltage waveform to satisfy the particular system readback requirements. A single track of magnetic bit groups is formed on layer 22 in positional correspondence with a line of characters on sheet 21. As a result, a self-synchronized reading apparatus may be employed to readout the magnetic record.

With reference to the drawings, there is illustrated one embodiment of the instant recording apparatus for simultaneously writing a human readable and a magnetic record on the sheet 21 and the layer 22, respectively. The apparatus, FIG. 4, comprises a conventional electric typewriter 26 with a full 50-key keyboard having upper and lower case characters, as well as a backspace key 27, a special erase key 28 for erasing magnetic data, a space bar 29, a carriage return key 30, and a shift key 31.

Erase key 28, space bar 29, carriage return key 30 and shift key 31 all have permanent magnets 32 fixedly mounted on lower extensions thereof. Each of the magnets is movable past an associated reed switch 35 upon depression of its associated key or bar; the reed-like contacts of each switch closing in response to the movement of a magnet therepast.

Electrical signals produced upon reed switch closure indicate which of the erase key 28, space bar 29, carriage return key 30 or the shift key 31 has been depressed by the typist. In addition to the special signals derived in response to depression of keys 28, 30 and 31 and bar 29, a signal is similarly derived upon depression of any of the remaining keys on the typewriter keyboard.

In addition to these signals, all signals produced in response to the depression of the remaining keys on keyboard, other than erase key 28, and the shift key 31 and fed to a diode coding matrix designated generally by numeral 36 via a multi-lead cable 37. The electrical signals fed to the matrix are obtained from closures of individual switches, the state of which, as mentioned above, are under the control of magnets associated with individual keys on the keyboard. Assuming that the remaining keys total 50, there will be 50 additional switches and 50 additional connecting leads. Matrix 36 is constructed so that if any one of the fifty leads is connected to ground in response to closure of an associated switch by activation of a selected key on the keyboard, eight predetermined binary electrical signals are simultaneously produced on eight conductors leading out of the matrix. The first six bits indicate which key of the keyboard has been depressed, the seventh bit indicates whether the shift key 31 has been depressed and the eighth bit is employed as a parity check. Special codes are associated with spacer bar 29 and carriage return key 30, whereby the binary bit combination for these keys is different from that of any other keys, while preserving the parity check. To preserve the parity check for upper case characters, diode coding matrix 36 includes means for inverting the parity bit for each character in response to activation of shift key 31, as well as means for generating a 0 bit as the seventh bit if the shift key 31 is activated. The eight predetermined signals obtained from the output of the diode coding matrix 36 are applied to the recording circuit 39. High amplitude current pulses generated at 39 pass thru the normally closed relay contacts of a switching circuit 38 to recording head 41, fixedly mounted above a platen 42 in typically horizontal alignment with a type guide 43.

Figure 5:
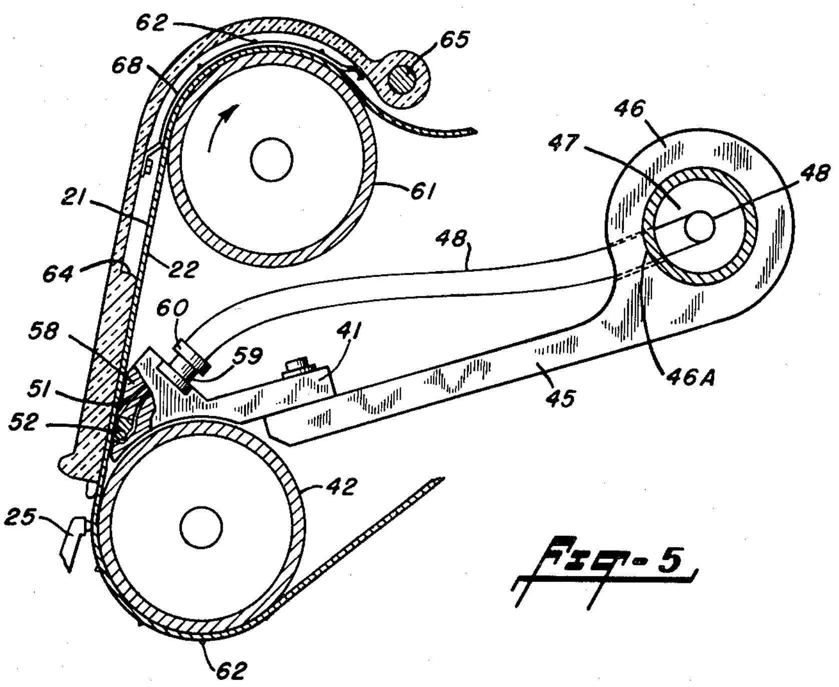
FIG. 5 is a sectional view taken through the lines 5—5, FIG. 4, showing the relationship between the magnetic recording head of the present invention in combination with other parts of the typewriter mechanism.
Figures 6, 7:
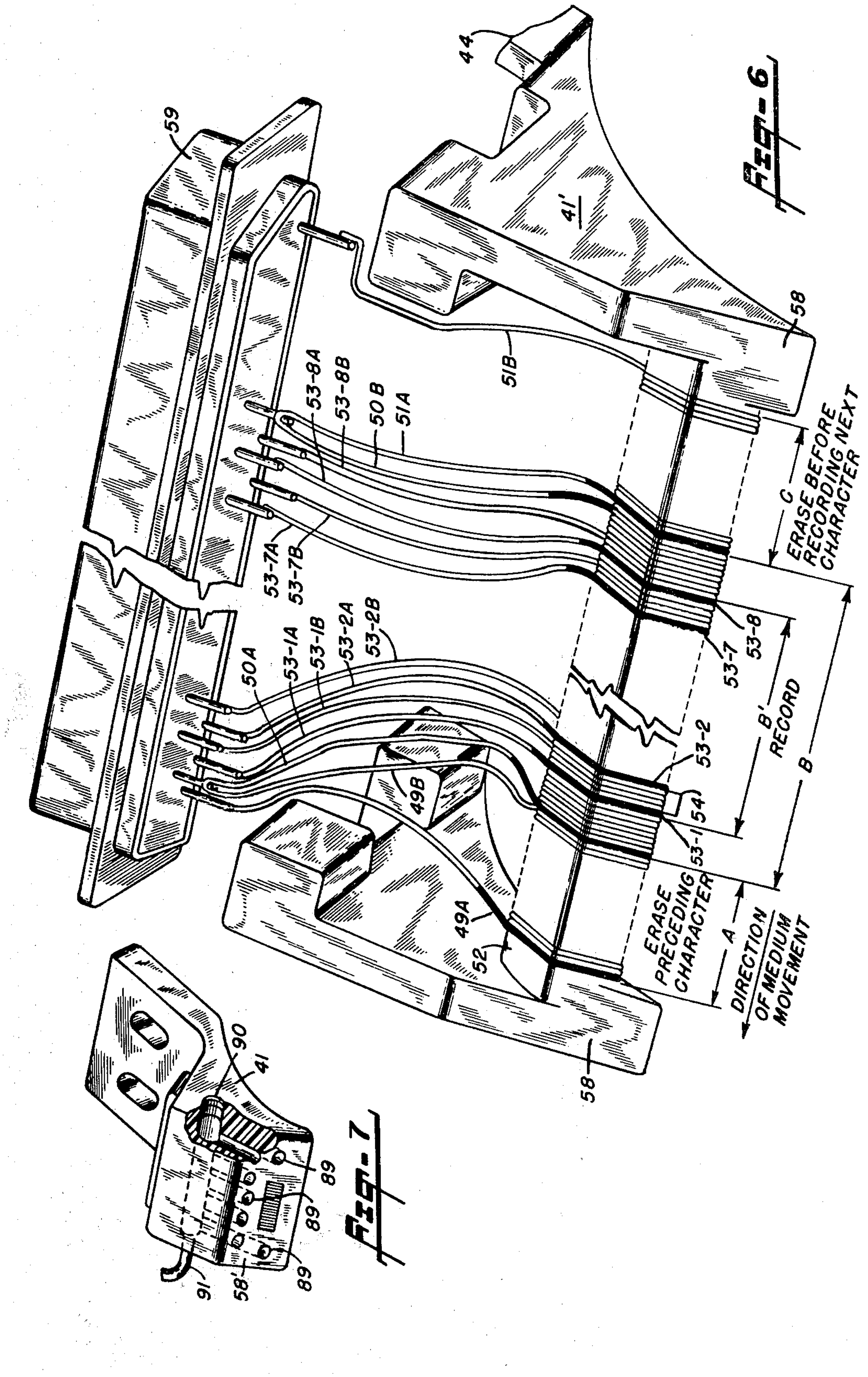
FIG. 6 is an enlarged, perspective view of a portion of a recording head frame and flux-producing windings constructed in accordance with the present invention.
FIG. 7 is a perspective view illustrating a system for vacuum drawing the magnetizable backing into contact with the windings of the recording head.

With reference to FIGS. 1, 5 and 6, a magnetic recording head 41 is fixedly mounted to an arm 45 having an enlarged inner end fixedly mounted on a hollow shaft 47 which in turn is mounted integral with the frame of the typewriter. With the head 41 fixedly positioned centrally of the typewriter fram in typical alignment with the type guide 43. The shaft 47, which carries the arm 46 and head 41, is typically on the order of three times the length of the platen 42 in order to permit the recording of magnetic characters at either edge of the medium 21,22. Signals from switch 38 are coupled to head 41 by conductors sheathed in a cable 48 and inserted into the shaft 47 and emerging from the interior of the shaft and the arm 46 by way of a bore 46A extending transversely through a portion of the arm and the shaft. Each of the conductors forming cable 48 is connected to one terminal pin of a standard multiterminal connector plug 60, which is manually insertable into connector receptacle 59 of head 41, as indicated by FIGS. 1 and 5.

MAGNETIC RECORDING — DETAILS OF RECORDING HEAD

With general reference to FIG. 6, the head 41 is characterizable as a coreless magnetic head having three sections A,B and C; each equal in width, and typically 100 mils wide, with each section performing a different function determined by a selected mode of typewriter operation. The first section designated A, comprises a plurality of turns, typically 52, of a single, continuous conductor having two end leads 49A and 49B, respectively, which are energized when it is required to erase (by degaussing) a previously recorded character. During an erase mode, in section B, between sections A and C, a discrete magnetizable area of the backing 22 is erased before a recording is made thereon ensuring a greater accuracy and integrity to recording. To this end, fringe areas at both ends of record section B' are degaussed by appropriately energizing spaced windings separating section B' from sections A and C, respectively. Similarly, section A during the erase mode erases the discrete record area and adjacent fringe areas of a previously recorded character. The degaussing of fringe areas also reduces the possibility of nonerased, previously recorded magnetic bits remaining on a reinserted, slightly misaligned paper 21 in the typewriter. In section C, adjoining section B, an area is similarly erased while a preceding character is recorded in section B'. Section C is formed by a plurality of turns of a single, continuous conductor having lead ends 51A and 51B, respectively.

Typically, each conductor is constituted by a copper wire having a diameter of 1.75 mils coated with an electrical insulating layer of polyurethane of 0.1 mil thickness. Each conductor is wound evenly around a mandrel-like portion 52 of the head frame 41'so that an elongated section of each convolution is in physical contact with the layer 22. Because each section of conductor is coated with insulation, short circuiting is prevented between mutually adjacent conductors. Parts of the recording head 41 other than the conductors wound upon the portion 52, are preferably composed of a suitable insulating material, such as a polymeric or epoxy resin.

For each magnetic bit recorded on the backing 22, only every fifth winding or turn of section B'(FIG.6) is energized and the remaining four windings or turns for that bit are utilized as spacers between the energized windings. Eight single conductors are interleaved between certain juxtaposed but spaced-apart convolutions of the continuous winding on the mandrel 52. Each such recording conductor forms less than a complete turn on the mandrel and typically has a portion of length suitably affixed to only the top, bottom and front surfaces of the mandrel as viewed in FIG.6. Also, each recording conductor is separated by four spaced turns which are merely spacers, and are not supplied with signals. In FIG. 6, numerals 53-1 and 53-2 designate the recording windings for the first and second bits of a character, respectively, and the spacer turns are designated 54. The seventh and eighth record windings are designated 53-7 and 53-8, respectively. Of course, it is to be understood that the dimensions illustrated in FIG. 6 are greatly exaggerated and that the total lateral distance between record winding 53-1 for the first bit of a character and record winding 53-8 for the last (eighth) bit of that character is typically on the order of 68 mils. In the manner described for spacing windings 53-1 and 53-2 for recording the first and second bits, four spacer conductors are utilized to maintain precise separation between each of the six remaining record windings 53-3 . . . 53-8 from one another. Thus, section A is defined by the windings connected to leads 49A and 49B, section B is defined by the windings connected to leads 50A and 50B, said section C is defined by the windings connected to leads 51A and 51B, with leads 49B, 50A and 50B, 51A, respectively, being commonly connected at single terminals. Leads 49B, 50A and 50B, 51A extend from a continuous winding, as disclosed above, and recording lead pairs 53-1A, 53-1B

. . . 53-8A, 53-8B, extend from less than single complete turns of corresponding recording windings 53-1 . . . 53-8.

It may be noted that no magnetic core material is employed in the head 41 and that turns having insulation thereon are utilized as spacers between adjacent recording turns. Sufficient magnetic flux is applied by windings 53-1, 53-2 . . . 53-8 to magnetic backing 22 by pulsing these turns with high intensity currents and by allowing these turns to contact the backing 22. As described, infra, circuitry is provided to pulse windings 53-1, 53-2 . . . 53-8 with currents having peak magnitudes on the order of 20 amperes for approximately 10 microseconds. Such currents create enough flux around the windings to appropriately change the magnetic state of a defined, adjacent area of the layer 22. The extremely large amplitude currents do not overheat the conductors to the point to rupture because of the extremely short time duration of these pulses.

OTHER EMBODIMENTS OF THE RECORDING HEAD

Section B of the head 41 may be modified such that two separate adjacent windings are utilized for recording each bit. In such a configuration, the current flowing through a first one of the two windings is in a direction opposite to the current flowing through the second one of the two windings for the same bit, whereby the first winding is switched to a first current source when the particular bit is a binary 1 and the second winding is switched to a second current source when a binary 0 is to be recorded. As in the case of the FIG. 6 embodiment, the recording windings for each bit are separated by four spacer windings to provide the desired fringe spacings on either side of each magnetic area commensuarate with the area required for a character.

FIG. 7 illustrates another embodiment of a recording head, designated 41, wherein contact between backing 22 and a surface 58' of the head 41 is maintained by a plurality of apertures 89 extending perpendicular to the surface of the head that contacts backing 22. Apertures 89 are formed in the head 41 during the manufacture thereof and communicate with a common bore 90 connected to a suitable source of fluid pressure, such as a vacuum pump (not shown). The pump applies a subatmospheric pressure of approximately 13 pounds per square inch to the backing 22 by way of the aperture 89, this vacuum being sufficient to maintain the record medium in firm contact with the recording windings 53-1 . . . 53-8, and is controlled by a solenoid valve 91-1, FIG. 1, installed in tube 91. Alternately, an above atmospheric pressure applied via tube 90, may be controlled by an in-line solenoid valve installed in the tube 91.

According to still another embodiment of the invention, the longitudinal axes of erase and recording windings are mutually orthogonal, that is, positioned at right angles to each other. In such case the erase windings are located one character position on either side of the intermediate section B of FIG. 6 to enable erasing prior to recording or in response to depression of say a backspace key. Thus, the two erase windings would be positioned orthogonal to the windings depicted in sections A and C, respectively, in FIG. 6.

Another embodiment of the invention would place all of the record and erase conductors mutually parallel to each other and spaced one character apart with their respective longitudinal axes aligned. Thus, the two erase windings and record windings would be positioned orthogonal to the windings depicted in sections A, C and B, respectively of FIG. 6.

A further embodiment would place the record conductors orthogonal to the erase conductors and one character apart from one another. Thus, the record windings would be orthogonal to the record winding depicted in section B of FIG. 6.

MAGNETIC RECORDING — DETAILS OF TYPEWRITER MECHANISM

To ensure that the record windings designated 53-1, 53-2 . . . 53-8 are in virtual contact with the magnetic surface of the layer 22 FIG. 5, the head 41 is placed directly above platen 42 and is contoured along the lower surface to conform closely with the cylindrical portion of platen 42 immediately above the point where type bar 25 strikes the sheet 21.

To maintain the layer 22 in contact with conductors 53-1 . . . 53-8, platen 61 is mounted on carriage assembly 50 approximately directly above platen 42 and has its longitudinal axis extending parallel to the longitudinal axis of the lower platen. Platens 42 and 61 carry radially-projecting pins 62 for engaging pinholes 63 located a fixed distance inwardly of the margins of sheet 21 to provide a positive pin feed for the paper sheet and to maintain the sheet in horizontal alignment.

Figure 4:
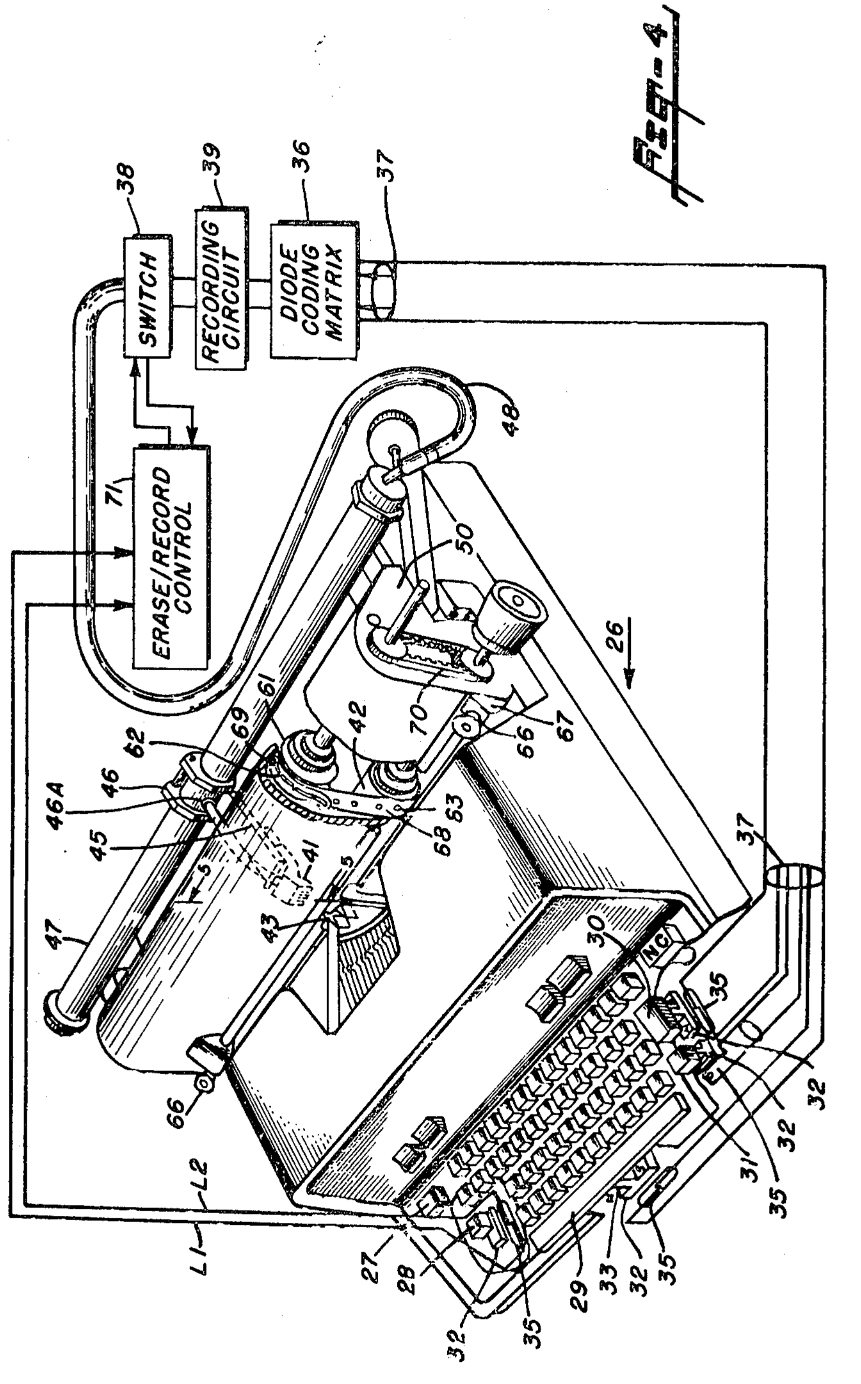
FIG. 4 is a perspective view, in combination with a circuit block diagram, of one embodiment of a typewriter-encoder constructed in accordance with the present invention.

Referring to FIGS. 4 and 5, the magnetizable backing 22 is pressed into firm contact with the conductors 53-1 . . . 53-8 by a transparent hold-down plate 64 spanning opposed columns of pins 62. Pins 65 mounted stationary on carriage assembly 50 hinge the upper right-hand end of the plate 64, as viewed in FIG. 5, for pivotal movement thereon. The lower left end of the plate 64 includes pins 66 that selectively engage bores, not shown in abutment 67 that is also fixedly mounted to carriage assembly 50. Hold-down plate 64 has a section of enlarged width at the lower end thereof for forcing the backing 22 into good electrical contact with the conductors 53-1 . . . 53-8 of head 41.

Proper registry is maintained despite rubbing between both faces of the sheet 21 and backing 22 by the clamping action of elongated spring clips 68. Clips 68 are connected at each end of plate 64 so that a longitudinal slot 69 formed in the clips 68 accommodates the pins 62 of platen 61 as the pins rotate. The ends of clips 68, FIG. 5, remote from the hinge pin 65, are connected to the plate 64 and are configured to extend parallel to the semicircular upper portion of the plate 64 to enable the sheet 21 to issue freely from under upper platen 61. Platens 42 and 61 are rotated together in synchronism by a belt drive 70 so that pins 62 positively engage and drive the paper sheet 21 and the backing 22.

MAGNETIC RECORDING—GENERAL DESCRIPTION OF RECORDING OPERATION

The magnetic bits are recorded on the magnetic backing 22 simultaneously as a corresponding character is typed onto the sheet 21. A typical recording is initiated by an operator depressing a selected character key on the keyboard FIG. 4 whereupon the corresponding type bar is driven by conventional means to rotate about a pivot in the usual manner. When the corresponding switch closes, ground potential is applied to the conductor connected to one side of the switch and included among the conductors grouped in the cable 37. In response to the grounding of this particular conductor, diode coding matrix 36 generates eight binary signals in parallel on its eight output conductors. These eight signals are fed through switch 38 to recording circuit 39 and to conductors 53-1 . . . 53-8, inclusive, FIG. 6. Each of conductors 53-1 . . . 53-8 receives, by way of its associated leads and terminal connections to the block 59, a different predetermined, unique binary signal with the binary 1 signals flowing through the conductors in one direction and the binary 0 signals flowing through the conductors in an opposite direction.

The binary 1 and 0 currents flowing in conductors 53-1 . . . 53-8, inclusive, cause magnetic fluxes of opposite directions to be generated, dependent upon the polarity of the currents applied to the respective leads and windings. For example, if it is assumed that the current pulses applied to the first two windings 53-1 and 53-2 are as indicated by the waveforms of FIG. 2, a binary 1 positive current flows through winding 53-1, whereupon a clockwise flux is induced by that winding in the region surrounding it. Simultaneously a binary 0 negative current flows through winding 53-2 whereupon a counterclockwise flux is induced in the area surrounding the winding. In response to the clockwise and counterclockwise fluxes derived from conductors 53-1 and 53-2 the surface areas of backing 22 directly in contact with these conductors are magnetized in opposite directions, typically across a 3 mil width of the backing 22. With adjacent conductors 53-1 and 53-2 sufficiently separated from each other by, for example, 10 mils, the centers of the flux concentrations resulting from current flows through these conductors, are likewise separated by 10 mils. The fringing effects of the magnetic flux may spread approximately 1.5 mils to either side of the center of the winding, so that there is approximately a 7 mil gap between adjacent flux areas on the backing 22. The 7 mil spacing between the extremities of the magnetic bits recorded on the backing 22 is provided by the four spacing windings 54 interposed between adjacent recording windings 53-1 and 53-2. Because of the spacing between adjacent recorded bits, the magnetic data stored on the backing 22 may be readily read out by a conventional magnetic read head. The current pulses required to drive the record windings are typically pulses having very steep leading edges and slowly declining trailing edges. Typically the pulses having a maximum amplitude on the order of 20 amperes and drop to a value of less than one ampere in a time interval of approximately 100 microseconds.

The entire operation described for recording magnetic bits on the backing 22 occurs in less time than the interval between activation of the type bar and release of platen 42 prior to the type bar striking it. It is important that the magnetic bits be recorded on the backing 22 with the platen 42 stationary to maintain the recorded bits in alignment.

FIG. 9 illustrates another embodiment of a recording system wherein a conventional, rotatable ball-type printing head 90 is mechanically coupled to the magnetic recording head 41 through a cable 91. The coupling is by means of a system of freely rotatable pulleys 92 and is such that the head 41 remains directly opposite the head 90 at all positions of the head 90.

In certain conventional typewriters which utilize ball or cylindrical printing heads to type characters onto paper mediums, the logic utilized to effect the requisite incremental angular displacements of the head 90, whereby the selected character is rotated opposite the paper immediately prior to the imprinting thereof, typically provides representative coding which may then be supplied directly to the diode matrix 36 for initiating operation of the aforedescribed encoding circuitry associated with the head 41. Thus, in such systems the problem of generating binary voltage pulses representing the selected key on the keyboard is significantly reduced.

We claim:

1. A record comprising a singular composite flexible sheet having a visually readable front surface and a backing on the reverse side thereof comprised of a magnetizable flexible material, the front surface of said sheet having a multiplicity of alphanumeric characters visually recorded thereon in at least one single line, said magnetizable material including, at least one track comprised of discrete groups of magnetically coded characters applied to the exterior surface of said backing, each of the character groups composed of a number of equally spaced, magnetic characters defined by north-south or south-north magnetizations, each group of magnetic characters corresponding to each of said visually recorded characters and being in a fixed positional position relationship therewith, and essentially degaussed areas on said exterior surface of said backing between adjacent groups of magnetic characters.

2. The record of claim 1 wherein the magnetizations for each magnetic character are on a space on said medium above the space on the front surface of said sheet where the corresponding visually recorded character is located, and said corresponding visually recorded characters and magnetic groups are in alignment on said sheet.

3. The record of claim 1 wherein said visually recorded characters are both upper and lower case, and at least seven magnetizations are provided for each character.

4. The record of claim 1 wherein said magnetic characters have a height approximately equal to the height required of the visual characters.

5. The record of claim 1 wherein the visually readable front surface is a sheet of paper of any desired color and wherein the backing is a thin sheet of flexible magnetizable material affixed to the reverse side of said paper.

* * * * *